(12) United States Patent
Chan et al.

(10) Patent No.: US 9,104,306 B2
(45) Date of Patent: Aug. 11, 2015

(54) TRANSLATION OF DIRECTIONAL INPUT TO GESTURE

(75) Inventors: Lye Hock Bernard Chan, Penang (MY); Chong Pin Jonathan Teoh, Pulau Pinang (MY); Boon How Kok, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 991 days.

(21) Appl. No.: 12/916,121

(22) Filed: Oct. 29, 2010

(65) Prior Publication Data

US 2012/0110518 A1 May 3, 2012

(51) Int. Cl.
G06F 3/0488 (2013.01)
G06F 3/023 (2006.01)
G06F 3/01 (2006.01)

(52) U.S. Cl.
CPC ............ *G06F 3/04883* (2013.01); *G06F 3/018* (2013.01); *G06F 3/0233* (2013.01)

(58) Field of Classification Search
None
See application file for complete search history.

(56) References Cited

U.S. PATENT DOCUMENTS

| | | | | |
|---|---|---|---|---|
| 5,125,039 A | * | 6/1992 | Hawkins | 382/161 |
| 5,307,267 A | * | 4/1994 | Yang | 715/210 |
| 5,596,656 A | * | 1/1997 | Goldberg | 382/186 |
| 5,644,653 A | * | 7/1997 | Sunakawa et al. | 382/187 |
| 5,784,504 A | * | 7/1998 | Anderson et al. | 382/309 |
| 5,796,406 A | * | 8/1998 | Shigematsu et al. | 715/863 |
| 5,926,566 A | * | 7/1999 | Wang et al. | 382/185 |
| 6,041,137 A | * | 3/2000 | Van Kleeck | 382/185 |
| 6,100,538 A | | 8/2000 | Ogawa | |
| 6,107,994 A | * | 8/2000 | Harada et al. | 345/168 |
| 6,128,007 A | * | 10/2000 | Seybold | 345/179 |
| 6,366,653 B1 | * | 4/2002 | Yeh et al. | 379/93.05 |
| 6,493,464 B1 | * | 12/2002 | Hawkins et al. | 382/189 |
| 6,639,584 B1 | * | 10/2003 | Li | 345/173 |
| 6,738,514 B1 | | 5/2004 | Shin et al. | |
| 6,839,464 B2 | | 1/2005 | Hawkins et al. | |
| 7,042,809 B2 | | 5/2006 | Mignot | |
| 7,274,808 B2 | | 9/2007 | Baharav et al. | |
| 2002/0145592 A1 | * | 10/2002 | Schauer | 345/156 |
| 2002/0196978 A1 | * | 12/2002 | Hawkins et al. | 382/189 |
| 2003/0046401 A1 | * | 3/2003 | Abbott et al. | 709/228 |
| 2003/0185444 A1 | * | 10/2003 | Honda | 382/186 |

(Continued)

FOREIGN PATENT DOCUMENTS

CN 101517518 8/2009
CN 101518058 8/2009

(Continued)

OTHER PUBLICATIONS

Mark Swofford, "Find Chinese characters online by drawing them with your mouse," Apr. 8, 2008, http://pinyin.info/news/2008/find-chinese-characters-online-by-drawing-them-with-your-mouse/.*

*Primary Examiner* — Matt Kim
*Assistant Examiner* — Ryan Barrett

(57) ABSTRACT

A user device is disclosed which includes a touch input and a keypad input. The user device is configured to operate in a gesture capture mode as well as a navigation mode. In the navigation mode, the user interfaces with the touch input to move a cursor or similar selection tool within the user output. In the gesture capture mode, the user interfaces with the touch input to provide gesture data that is translated into key code output having a similar or identical format to outputs of the keypad.

13 Claims, 8 Drawing Sheets

(56) References Cited

U.S. PATENT DOCUMENTS

| | | | |
|---|---|---|---|
| 2003/0212563 A1* | 11/2003 | Ju et al. | 704/277 |
| 2004/0012558 A1* | 1/2004 | Kisuki et al. | 345/156 |
| 2004/0042346 A1* | 3/2004 | Mignot | 368/69 |
| 2004/0208348 A1* | 10/2004 | Baharav et al. | 382/124 |
| 2005/0065775 A1* | 3/2005 | Poon | 704/7 |
| 2005/0275638 A1* | 12/2005 | Kolmykov-Zotov et al. | 345/179 |
| 2005/0276480 A1* | 12/2005 | Li et al. | 382/185 |
| 2008/0195388 A1* | 8/2008 | Bower et al. | 704/243 |
| 2008/0312911 A1* | 12/2008 | Zhang | 704/10 |
| 2009/0055381 A1* | 2/2009 | Wu et al. | 707/5 |
| 2009/0132231 A1* | 5/2009 | O'Dell | 704/2 |
| 2009/0150322 A1* | 6/2009 | Bower et al. | 706/50 |
| 2010/0005086 A1* | 1/2010 | Wang et al. | 707/5 |
| 2010/0025123 A1* | 2/2010 | Lee et al. | 178/18.03 |
| 2010/0058251 A1* | 3/2010 | Rottler et al. | 715/863 |
| 2010/0060586 A1* | 3/2010 | Pisula et al. | 345/169 |
| 2010/0080462 A1* | 4/2010 | Miljanic et al. | 382/186 |
| 2010/0090968 A1* | 4/2010 | Lee et al. | 345/173 |
| 2010/0164880 A1 | 7/2010 | Huang et al. | |
| 2010/0169770 A1* | 7/2010 | Hong et al. | 715/261 |
| 2010/0235118 A1* | 9/2010 | Moore et al. | 702/57 |
| 2010/0302164 A1* | 12/2010 | Pienimaa et al. | 345/168 |
| 2011/0134068 A1* | 6/2011 | Shimoni | 345/173 |
| 2011/0148786 A1* | 6/2011 | Day et al. | 345/173 |
| 2011/0316772 A1* | 12/2011 | Zhang et al. | 345/156 |
| 2012/0016658 A1* | 1/2012 | Wu et al. | 704/3 |
| 2012/0041752 A1* | 2/2012 | Wang et al. | 704/2 |
| 2012/0254786 A1* | 10/2012 | Colley | 715/773 |
| 2013/0132871 A1* | 5/2013 | Zeng et al. | 715/762 |

FOREIGN PATENT DOCUMENTS

| | | | | |
|---|---|---|---|---|
| WO | 02/28067 A1 | 4/2002 | | |
| WO | WO 2009039870 A1 * | 4/2009 | | G06F 3/01 |

* cited by examiner

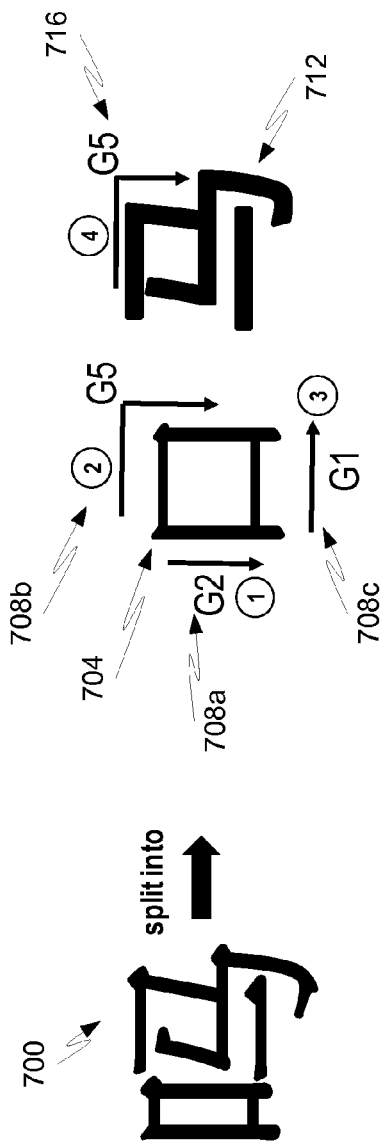
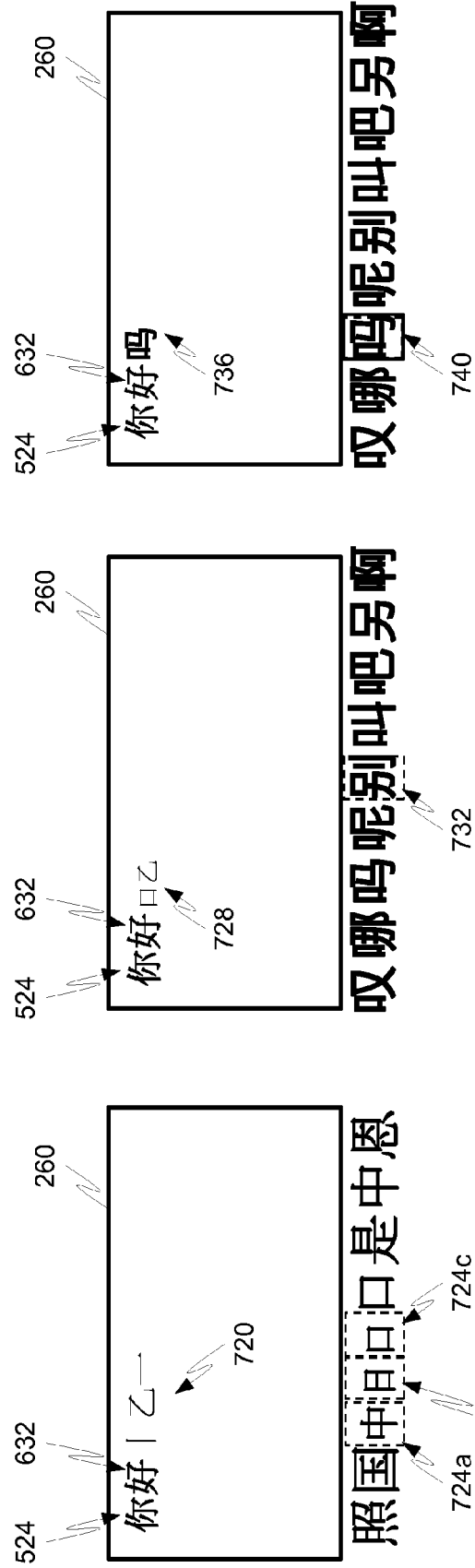
Fig. 7A
Fig. 7B
Fig. 7C
Fig. 7D

TRANSLATION OF DIRECTIONAL INPUT TO GESTURE

FIELD OF THE DISCLOSURE

The present disclosure is generally directed toward capturing user input in an electronic device.

BACKGROUND

Various solutions allowing recognition of characters traced manually on an input zone of a user device are known. Currently available solutions are particularly used for allowing manual input of data, without using a keyboard, in electronic devices, particularly portable electronic devices such as cellular phones, Personal Digital Assistants (PDAs), and the like.

One current solution provides complex recognition algorithms based on a dot matrix or bitmap image of the traced character, which is compared to the model data of a predetermined set of characters to identify the character closest to the trace performed. This solution is impractical and often much too heavy and demanding in terms of computational time and power to be applied in mobile devices which have limited processing capabilities. Another drawback of this solution lies in the fact that it requires a large memory space for defining the characters to be recognized.

Given the complexity and the strong similarity of certain characters, the current practice is to adopt certain simplifications in the set of characters (for example breaking down the characters into different sets of alphabetic characters, numerical characters, symbolic characters, etc., particularly in order to avoid confusion between certain characters such as "O" and "0", "B" and "8", "+" and "T", etc.) and to force the user to trace the characters in accordance with well determined sequences which are sometimes contrary to his normal practice or even any normal practice. Thus, with the existing solutions, there is often only one possible way of tracing each character so that it is not confused with others. Moreover, the sequences which have to be adopted do not necessarily correspond to the natural trace of the desired character. These difficulties are even greater, given that handwriting characteristics are greatly variable and even completely opposite, for example between the handwriting of a right-handed person and a left-handed person.

Solutions like those described above are limited in that they require learning on the part of the user, often contrary to the user's native writing habits. Many users are reluctant to commit the necessary time to learning the determined patterns, thereby minimizing the appeal of such solutions.

Other current solutions map keypad inputs to predetermined characters. While this type of solution does avoid requiring the user to memorize and adhere to a specific set of tracing motions, this solution is not without its downfalls. One shortcoming of the keypad solution is that a user is required to interface through the keypad instead of through a more user friendly touch input. Another shortcoming is that most user devices provide only a limited number of keys, which means that only a limited number of characters can be mapped to a keyed input or multiple characters must be mapped to the same keyed input.

BRIEF DESCRIPTION OF THE DRAWINGS

The present disclosure is described in conjunction with the appended figures:

FIG. 7A depicts a complex third word and corresponding input gestures to create the same in accordance with embodiments of the present disclosure;

FIG. 7B depicts a user output after receiving the first, second, and third input gestures depicted in FIG. 7A;

FIG. 7C depicts a user output after the first part of the complex word in FIG. 7A is selected and after receiving the fourth input gesture of FIG. 7A;

FIG. 7D depicts a user output after the second part of the complex word in FIG. 7A is selected.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
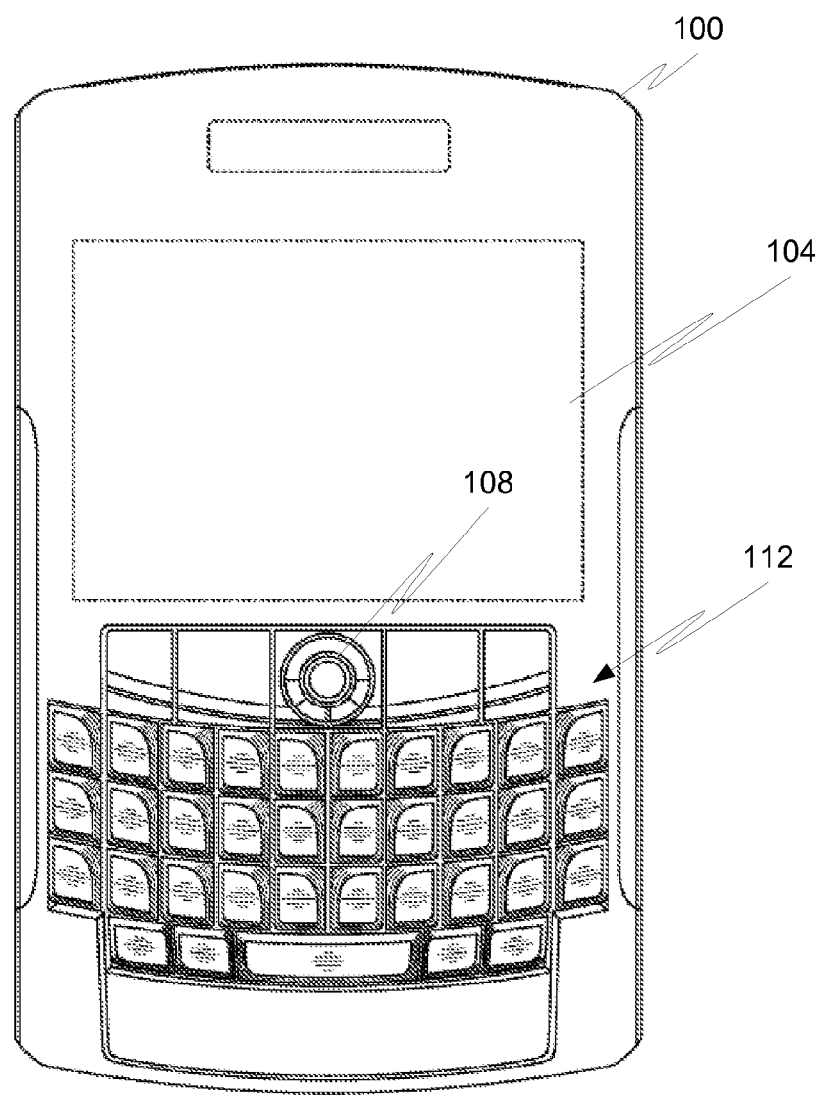
FIG. 1 is a perspective view of a user device in accordance with embodiments of the present disclosure.

FIG. 1 shows an illustrative embodiment of a user device 100. The user device 100 may include a display screen 104, a touch input 108, and a keypad input 112. The display screen 104, touch input 108, and keypad input 112 may be collectively referred to as the user interface of the user device 100. The user interface of the user device 100 may comprise other components such as a microphone (for receiving audio user input), a speaker (for providing audio user output), a camera (for capturing image input), and buttons in addition to the keypad for controlling various other operations of the user device 100.

In some embodiments, the display screen 104 is purely a user output, meaning that the display screen 104 is not configured to receive user input. In some embodiments, the display screen 104 may comprise a touch-pad or similar dual user input/output device. In such embodiments, the touch input 108 may be incorporated into the user output 104 by virtue of the fact that the display screen 104 is also configured to detect user input in the form of touch and/or image data and convert the touch or image data to an electrical signal for processing by the user device 100. If the display screen 104 is configured as a touch-screen input, then it may not be necessary to provide the user device 100 with a separate touch input 108.

The touch input 108 may comprise an input device which can be manipulated by a user's finger, thumb, and/or hand. Alternatively, or in addition, the touch input 108 may be manipulated by a stylus or the like. Any type of suitable touch input 108 may be utilized. Examples of suitable touch inputs 108 include, without limitation, an optical sensor (e.g., an optical finger navigation touch pad), a small area capacitive sensor, rocker switches, a miniature joystick, a twiddle, a touch-screen input, or the like. A user can employ the touch input 108 to move an object, cursor, selection tool, pointer, or the like on the display screen 104. Thus, the touch input 108 provides one option for the user to interface with the user device 100. In some embodiments, a user's finger engages the touch input 108 and the x-y motion of the user's finger across the touch input 108 is converted to x-y input data. The x-y input data may be used to manipulate the object, cursor, selection tool, pointer, or the like around the display screen 104. When x-y motion of the user's finger is used to navigate an object, cursor, selection tool, pointer, or the like around the display screen 104, the touch input 108 is considered to be operating in a navigation mode.

In some embodiments, the touch input 108 can also be operated in a gesture capture mode where x-y motion of the user's finger captured at the touch input 108 is converted to x-y input data. In the gesture capture mode, the x-y input data is further converted to gesture data, which is then converted to a key code output. In some embodiments, the x-y input data may be directly converted to a key code output without first being converted to gesture data. In the gesture capture mode, the translation of the x-y input data to a key code output enables the touch input 108 to provide output in a similar format to data outputs of the keypad 112. In some embodiments, the key code output may correspond to a character output which has been mapped to a button on the keypad (i.e., a hard key). In some embodiments, the key code output may correspond to a character stroke which has been mapped to a button on the keypad. In some embodiments, the key code output may correspond to a command which causes the touch input 108 to switch between the gesture capture mode and the navigation mode. In some embodiments, the key code output may correspond to a command which causes the user device 100 to generate and transmit a Dual-Tone Multi-Frequency (DTMF) signal to another communication device (e.g., switch or server executing an audio menu, another user device, or the like).

The keypad 112 provides another mechanism for receiving user input at the user device 100. The keypad 112 may correspond to any button or collection of buttons provided in any type of configuration. For example, the keypad 112 may correspond to a QWERTY keyboard, a derivative thereof, or alternatives for the same (e.g., a mobile version of a QWERTY keyboard, an alphabetic keyboard, or any keyboard used for a specific language). As another example, the keypad 112 may be configured as a dial-pad having buttons corresponding to 0-9 digits, a "#" key, and a "*" key. As another example, the keypad 112 may comprise a calculator input with buttons corresponding to 0-9 digits and one or more keys for performing mathematical operations. Combinations of the above-described keypad 112 configurations may also be implemented in accordance with embodiments of the present disclosure.

In some embodiments, the user device 100 corresponds to a mobile communication device; in particular, the user device 100 may correspond to a cellular phone, mobile phone, smart phone, or the like. Other types of suitable user devices 100 include, but are not limited to, computers, laptops, netbooks, telephones, typewriters with an electronic communication channel (e.g., Text Telephone (TTY)), or the like.

Figure 2:
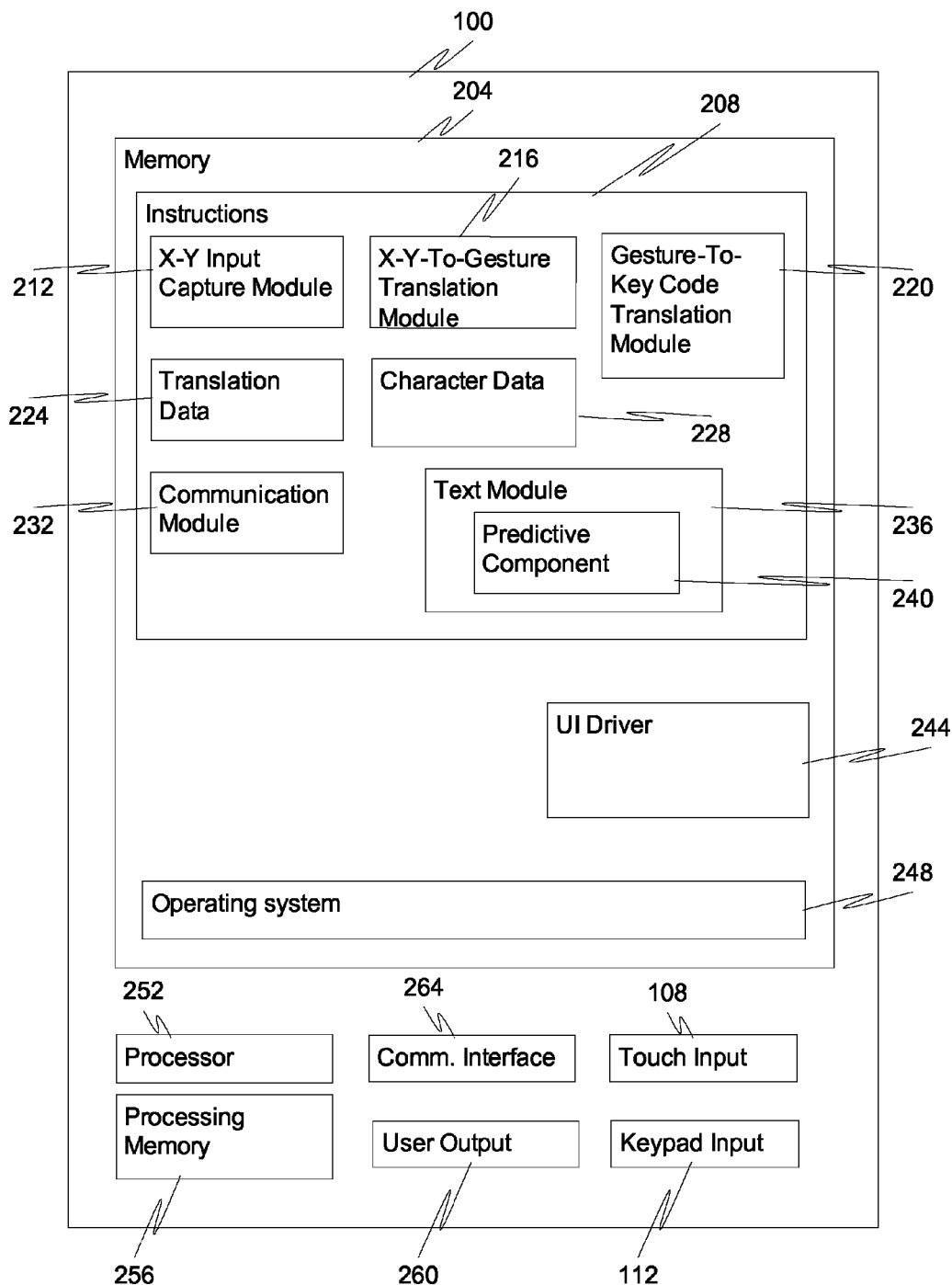
FIG. 2 is a block diagram of components of a user device in accordance with embodiments of the present disclosure.

With reference now to FIG. 2, additional details of a user device 100 will be described in accordance with embodiments of the present disclosure. The user device 100 may comprise memory 204 that includes a number of instructions 208, modules, and other data structures as well as a processor 252 for executing the instructions 208 and other contents of memory 204. The processor 252 may include any general-purpose programmable processor, digital signal processor (DSP), controller, or microcontroller for executing application programming.

Although the modules for performing the various methods/algorithms discussed herein are depicted as instructions 208 stored in memory 204, the components depicted and described in connection with FIG. 2 may be implemented as firmware in an external microcontroller, an Application Specific Integrated Circuit (ASIC), one or more hardware functions programmed into silicon, or combinations thereof. The configuration of components in the user device 100 depicted in FIG. 2 is merely illustrative of one implementation suitable in accordance with embodiments of the present disclosure.

The user device 100 may also include a communication interface 264 which allows the user device 100 to communicate with other devices via a communication link, which may be established over a communication network. Exemplary types of communication interfaces 264 include, without limitation, an RF antenna and driver (e.g., for cellular or Bluetooth communications), an infrared port, a fiberoptics interface, a Universal Serial Bus (USB) port, an Ethernet port, a serial data port, a parallel data port, any type of interface which facilitates communications over a packet-based communication network, such as the Internet, and so on.

In addition to a communication interface 264, the user device 100 may include a user interface which facilitates user interaction between the user device 100 and a user thereof. The user interface may comprise the touch input 108 and keypad input 112 as well as a user output 260. In some embodiments, the user output 260 includes the display screen 104 as well as other user output devices. Suitable user output devices, which may or may not be used for the display screen 104, include, without limitation, lights, projection screens, LCD screens, an LED array, a plasma screen, an individual LED, a seven segment LED display, a multi-digit LED display, etc. As noted above, the user interface may combine the functionality of the user input devices (i.e., touch input 108 and keypad input 112) and the user output 260 into a single device.

In addition to memory 204, the user device 100 may also include processing memory 256, which may be in the form of a Randomly Accessible Memory (RAM), cache memory, or any other type of memory used to facilitate efficient processing of instructions 208 by the processor 252.

Whereas the processing memory 256 is used to temporarily store data during processing tasks, the memory 204 is provided to store permanent or semi-permanent instructions 208 which control the operational behavior of the user device 100. The memory 204 and/or 256 may be implemented using various types of electronic memory generally including at least one array of non-volatile memory cells (e.g., Erasable Programmable Read Only Memory (EPROM) cells or FLASH memory cells, etc.) The memory 204 and/or 256 may also include at least one array of dynamic random access memory (DRAM) cells. The content of the DRAM cells may be pre-programmed and write-protected thereafter, whereas other portions of the memory may selectively be modified or erased.

Some components of memory 204 may include a User Interface (UI) driver 244 and an operating system 248, which is a high-level application that facilitates interactions between various other modules and applications in memory 204 and hardware components of the user device 100. The UI driver 244 may be responsible for facilitating operations of the user interface. In some embodiments, the UI driver 244 includes commands for determining when user inputs are received at the touch input 108 and/or keypad input 112, identifying parameters of received user inputs, conditioning parameters of received user inputs into data values which can be processed by the modules contained in memory 204, determining what and when to display data as an output at the user output 260, and the like.

In some embodiments, the operations of the UI driver 244 change depending upon whether the touch input 108 is being operated in a navigation mode or a gesture capture mode.

The various routines, modules, and data structures which may be included in memory 204 comprise one or more of an x-y input capture module 212, an x-y-to-gesture translation module 216, a gesture-to-key code translation module 220, a communication module 232, a text module 236, translation data 224, and character data 228.

The communication module 232 provides instructions which enable the user device 100 to communicate with other devices. In particular, the communication module 232 may comprise message encoding and/or decoding instructions, message encryption and/or decryption instructions, compression and/or decompression instructions, trans-coding instructions, and any other known type of instructions which facilitate communications over a communications network. For example, the communication module 232 may comprise instructions which enable the user device 100 to create one or more messages or communication packets which are appropriately formatted and transmitted in accordance with a known communication protocol via the communication interface 264. Likewise, the communication module 232 may also comprise instructions which enable the user device 100 to format messages received at the communication interface 264 from other communication devices for processing by various components of the user device 100. In particular, the communication module 232 permits the user device 100 to connect to another communication device thereby enabling a user thereof to engage in a communication session. Accordingly, the communication module 232 may facilitate audio, video, and/or text-based communication sessions.

Another module which may be provided in the instructions 208 is an x-y input capture module 212. The x-y input capture module 212, although depicted as being included in the instructions 208, may be provided as part of the UI driver 244. The x-y input capture module 212 comprises instructions which enable the functionality of the touch input 108. In particular, the x-y input capture module 212 is configured to receive data concerning x-y motion detected at the touch input 108 and convert the x-y motion data into a format suitable for processing by other components of the user device 100. In some embodiments, the x-y input capture module 212 also comprises the capability to determine an amount of x-y motion at the touch input 108 by determining a delta x value(i.e., an amount of x-axis motion detected) and delta y value (i.e., an amount of y-axis motion detected) for user motion as a function of time while engaging the touch input 108. In other words, the x-y input capture module 212 can detect motion at the touch input 108, determine an amount of motion detected along an x and y axis, and convert the determined amount of motion along each axis into x-y motion data. The x-y motion data can then be provided as an input to other modules for further processing.

In some embodiments, an x-y-to-gesture translation module 216 is provided that is configured to receive x-y motion data from the x-y input capture module 212 and convert the x-y motion data into gesture data. Similar to the x-y input capture module 212, the x-y gesture translation module 216 may be included in the instructions 208, as part of the UI driver 244, or a combination of the two.

In some embodiments, the x-y-to-gesture translation module 216 utilizes translation data 224 to convert the x-y motion data into gesture data. In some embodiments, gesture data corresponds to data describing a gesture or motion captured at the touch input 108. As one non-limiting example, if the touch input 108 corresponds to a track ball, optical finger navigation device, small area capacitive sensor, rocker switches, roller ball, joystick, twiddle, etc., then an infinite number of x-y motions can be captured. These x-y motions and the x-y motion data representing the same may be translated into a finite set of gestures such as SWIPE UP, SWIPE DOWN, SWIPE LEFT, SWIPE RIGHT, and combinations thereof. As one non-limiting example, the x-y-to-gesture translation module 216 may be configured to operate in an 8-way rocker mode where x-y motion data received from the x-y input capture module 212 is translated into one of the following swipe gestures: SWIPE UP; SWIPE DOWN; SWIPE LEFT; SWIPE RIGHT; SWIPE UP-RIGHT; SWIPE DOWN-RIGHT; SWIPE DOWN-LEFT; SWIPE UP-LEFT; and TAP. TAP is a gesture which allows the user to tap on the touch input 108 to signify a button click, it is also termed a "soft click" because there is no actual depression of a physical button, but the TAP gesture is recognized as a selection input. As can be appreciated, the x-y-to-gesture translation module 216 may convert the x-y motion data into other gesture outputs such as CIRCLE, U-TURN, and other known gestures.

The format of the translation data 224 may also determine how the x-y-to-gesture translation module 216 translates x-y motion data into gesture data. In some embodiments, it may be desirable to limit the number of gestures defined in the translation data 224 to provide a touch input 108 that is easy to learn and use. However, certain users may desire to use more complex gestures, in which case the translation data 224 may be expanded, for example, by allowing a user to edit the translation data 224 via a preferences editing tool.

Another module that may be provided in the instructions 208 is a gesture-to-key code translation module 220. Similar to both the x-y input capture module 212 and the x-y gesture translation module 216, the gesture-to-key code translation module 220 may be included in the instructions 208, as part of the UI driver 244, or a combination of the two.

In some embodiments, the gesture-to-key code translation module 220 receives gesture data outputs provided by the x-y-to-gesture translation module 216 and translates the gesture data into key code data. In some embodiments, key code data is provided in the same or similar format to data outputs of the keypad input 112. For example, key code data may emulate a keypad input 112 and may be processed by the processor 252 in the same manner as inputs received from the keypad input 112. Accordingly, the gesture-to-key code translation module 220 enables the touch input 108 to mimic certain outputs of the keypad input 112 by translating gesture data (which was originally x-y motion data) into key code outputs. In some embodiments, the key codes may correspond to predetermined swipes used to construct Chinese characters.

In some embodiments, the key codes may correspond to predetermined DTMF signals (or inputs at the keypad input 112 that would result in generating a DTMF signal), thereby allowing the user device 100 to provide DTMF functionality even if the keypad input 112 is in the form of a QWERTY keyboard, which conventionally is not capable of generating a DTMF signal. This is particularly useful in situations where the user of the user device 100 is interfacing with an audio menu, such as those provided by call centers, voicemail systems, and the like, and does not have a traditional phone keypad input which clearly shows a mapping of letters to numbers (e.g., 2—"ABC", 3—"DEF", 4—"GHI", . . . , 9—"WXYZ"). A user can interface with the touch input 108 and have x-y motion captured by the touch input 108 (e.g., motion defining a certain letter) be converted into key code input which generates the appropriate DTMF tone corresponding to a particular number on a traditional phone keypad input.

Similar to the x-y-to-gesture translation module 216, the gesture-to-key code translation module 220 may utilize the translation data 224 to map gesture data to key code outputs. In some embodiments, every gesture defined in the translation data 224 may be mapped to a different key code. In some embodiments, two or more gestures defined in the translation data 224 may be mapped to a common key code. In some embodiments, one or more gestures defined in the translation data 224 may be mapped to a command or series of commands which causes the processor 252 to execute some function or routine. For example, one or more gestures may be mapped to a command which causes the touch input 108 to switch between a navigation mode and a gesture capture mode. If such a mapping exists, the detection of a gesture corresponding to a mode-switching command may cause one or both of the x-y-to-gesture translation module 216 and gesture-to-key code translation module 220 to become operable or inoperable depending upon whether or not the touch input 108 is being switched to a navigation mode where the module(s) 216, 220 are not active (i.e., are not processing x-y motion data) or to a gesture capture mode where the module(s) 216, 220 are active (i.e., are processing x-y motion data).

Yet another module which may be provided in the instructions 208 is a text module 236. Similar to both the other modules described herein, the text module 236 may be included in the instructions 208, as part of the UI driver 244, in some other driver, as part of an operating system 248, or combinations thereof.

The text module 236, in some embodiments, enables a user to compose, read, forward, and/or reply to text messages. In some embodiments, the text module 236 utilizes data from one or more of the keypad input 112, the UI driver 244, the x-y input capture module 212, the x-y-to-gesture translation module 216, and the gesture-to-key code translation module 220 to help a user compose a text message which may be ultimately transmitted via the communication interface 264.

In some embodiments, the text module 236 may comprise a predictive component 240 which enables the text module 236 to suggest potential character or string inputs based on user input already received. For example, if a user has typed three letters, then the predictive component 240 can analyze the received three letters and suggest complete words that contain the received three letters. As another example, if a user is entering Chinese characters which are constructed with a series of multiple strokes, after a user has entered a single stroke the predictive component 240 may display a set of possible characters that have the single stroke as the first stroke in constructing the character. If the user enters another stroke, the predictive component 240 may update the set of possible characters based on the combination of the first two strokes already received. The text module 236 and predictive component 240, therefore, enable a user to enter a character or string of characters without necessarily providing a complete input that corresponds to the character or string of characters. Specifically, a user may select a desired character or string of characters from the set of possible characters suggested by the predictive component 240 and the selected character or string of characters may be inserted into the message that is being composed.

The predictive component 240 may reference character data 228 in providing the suggestions for characters or strings of characters. More specifically, the character data 228 may comprise information related to the construction of characters or strings of characters and the inputs, usually in the form of key codes, which are used to construct the entire character or string of characters. Thus, after each user input is received at either the touch input 108 or keypad input 112, the predictive component 240 determines the corresponding key code input and eliminates any characters or strings of characters from its suggestions that do not contain the key code input corresponding to the received user input.

Figure 3:
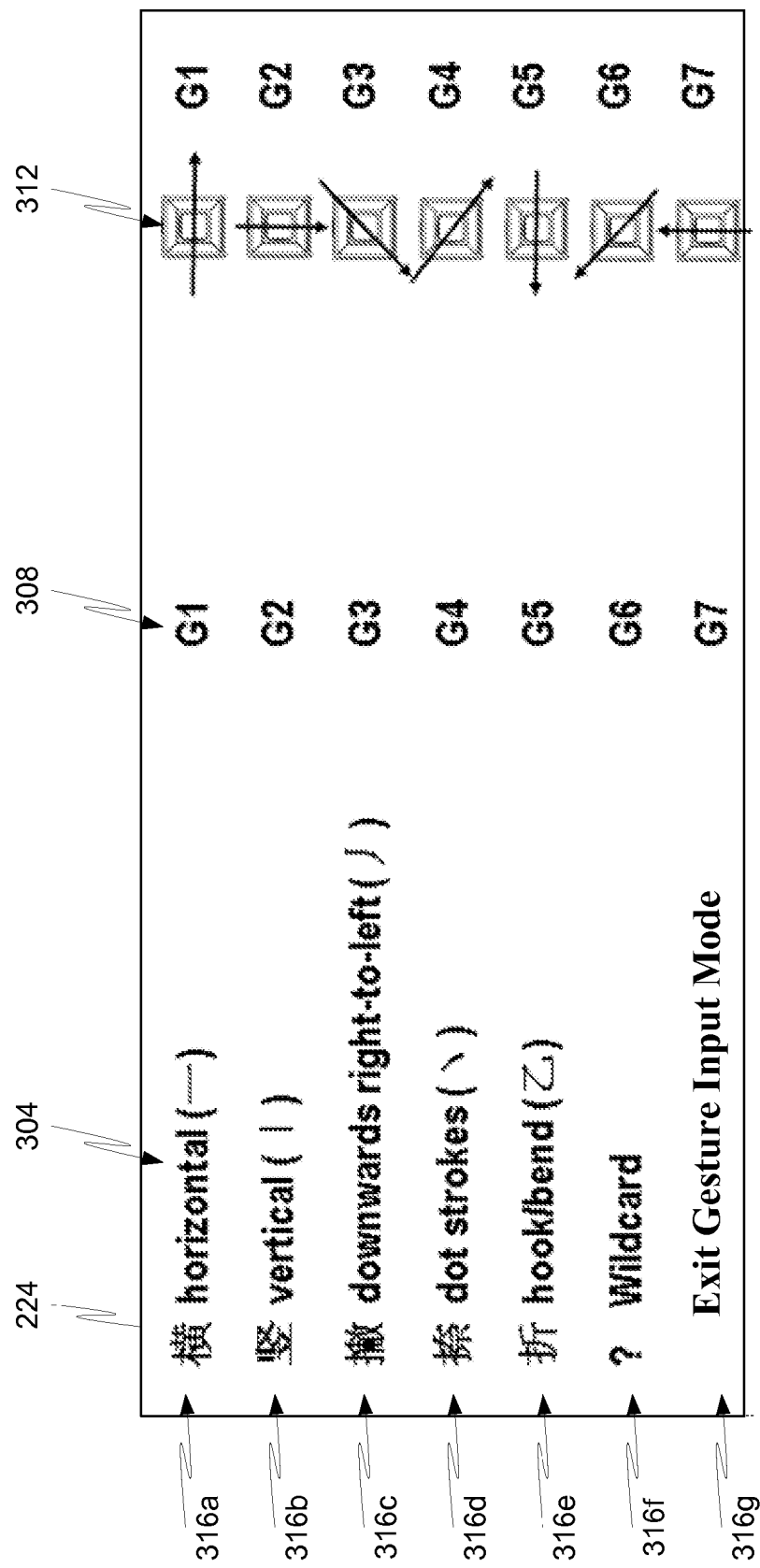
FIG. 3 is a tabular form of at least a portion of translation data in accordance with embodiments of the present disclosure.

With reference now to FIG. 3, details of one possible configuration of the translation data 224 will be described in accordance with at least some embodiments of the present disclosure. The translation data 224 may be configured to map a value in an x-y motion data field 312 to a value in a gesture data field 308 as well as map a value in the gesture data field 308 to a value in the key code data field 304. In some embodiments, the translation data can be re-configured depending upon whether a user of the user device 100 manipulates the touch input 108 with a right hand or a left hand.

In some embodiments, the key code data field 304 may contain values which correspond to a stroke type that has been mapped to a particular button on the keypad input 112. In embodiments where the translation data 224 is used to facilitate the construction of Chinese characters in a text message, the key code data field 304 may comprise values corresponding to a specific stroke type, a wildcard stroke, and/or a command to switch the touch input 108 between the gesture capture mode and navigation mode.

In operation, the x-y-to-gesture translation module 216 compares x-y motion data received from the x-y input capture module 212 with the data in the x-y motion data field 312. When a match is found, the x-y-to-gesture translation module 216 provides the gesture-to-key code translation module 220 with an identification of the matching value found in the x-y motion data field 312. The x-y-to gesture translation module 216 determines a corresponding key code value in the gesture data field 308 and provides that value as an output for further processing, which results in a keyboard action consistent with the corresponding value in the key code data field 304.

The non-limiting example depicted in FIG. 3 shows that in a first data mapping instance 316*a*, a SWIPE RIGHT gesture may be mapped to a first key code value (G1), which emulates a keyboard action (i.e., keypad input 112 command) of inputting a horizontal stroke. In a second data mapping instance 316*b*, a SWIPE DOWN gesture may be mapped to a second key code value (G2), which emulates a keyboard action of inputting a vertical stroke. In a third data mapping instance 316*c*, a SWIPE DOWN-LEFT gesture may be mapped to a third key code value (G3), which emulates a keyboard action of inputting a downwards right-to-left stroke. In a fourth mapping instance 316*d*, a SWIPE DOWN-RIGHT gesture may be mapped to a fourth key code value (G4), which emulates a keyboard action of inputting a dot stroke. In a fifth mapping instance 316*e*, a SWIPE LEFT gesture may be mapped to a fifth key code value (G5), which emulates a keyboard action of inputting a hook/bend stroke. In a sixth mapping instance 316*f*, a SWIPE UP-LEFT gesture may be mapped to a sixth key code value (G6), which emulates a keyboard action of inputting a widcard value. Wildcard values are generally useful when the user is uncertain about the type of strokes or the writing order of strokes in generating a character, for example. Using a wildcard value in place of an actual stroke enables the predictive component 240 to consider all possible stroke types in the sequence order where the wildcard value was inserted. Thus, wildcard values will not limit the search of the character data 228 by the predictive component 240 when providing character suggestions to a user. In a seventh mapping instance 316*g*, a SWIPE UP gesture may be mapped to a seventh key code value (G7), which emulates a keyboard action or series of actions which causes the touch input 108 to switch between the navigation mode of operation and the gesture capture mode of operation. If the x-y-to-gesture translation module 216 is operating in an 8-way rocker mode, then an eigth gesture (i.e., SWIPE UP-RIGHT) may be mapped to an eigth key code value (G8), which can emulate any type of user-defined keyboard action or which may emulate no action at all.

Figure 4:
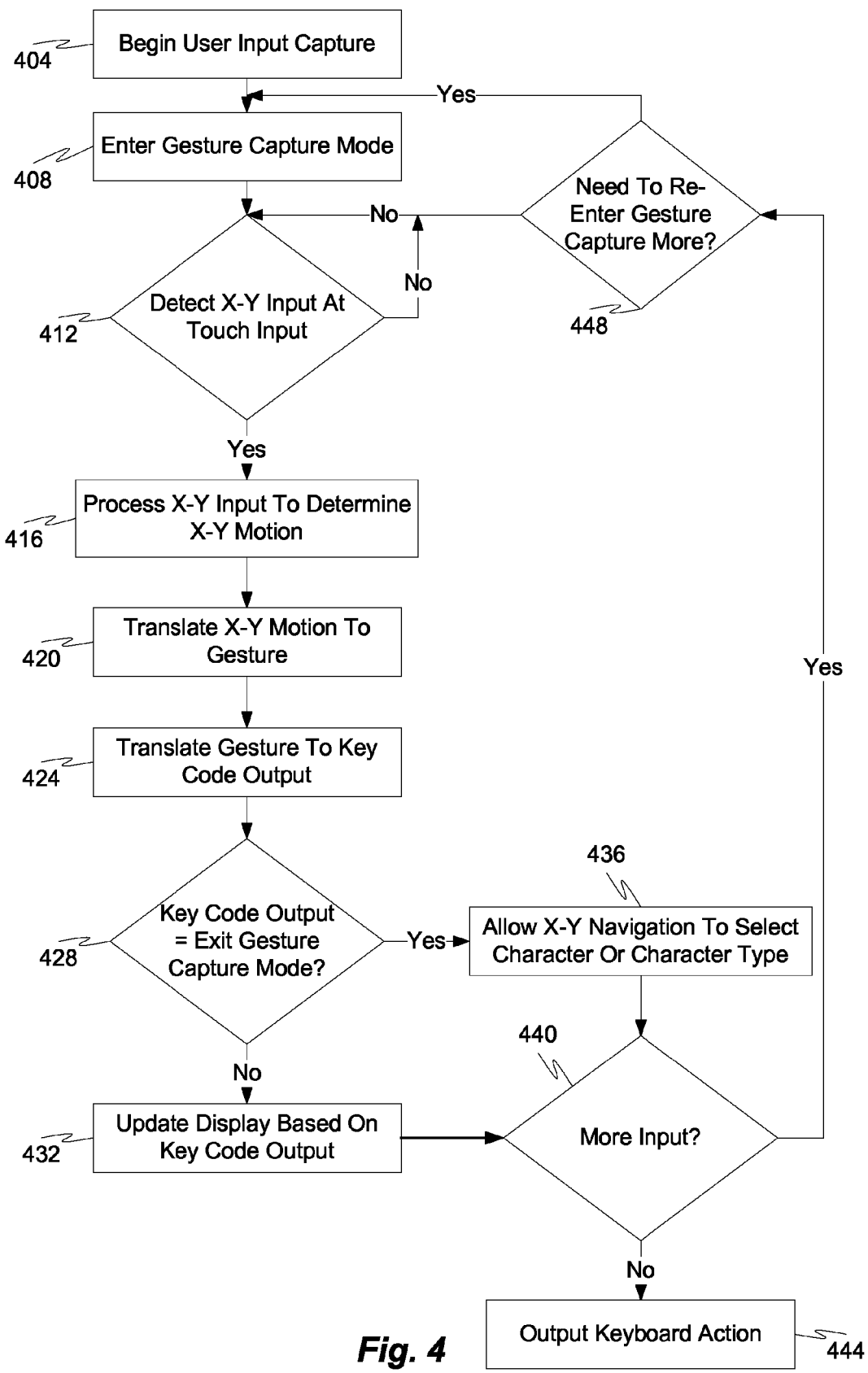
FIG. 4 is a flow diagram depicting a user input capture process in accordance with embodiments of the present disclosure.

With reference now to FIG. 4, a flow diagram depicting a user input capture process will be described in accordance with at least some embodiments of the present disclosure. The process begins at step 404 where the touch input 108 begins to capture user input. The process continues when the touch input 108 is put into a gesture capture mode of operation instead of the traditional navigation mode of operation (step 408). In the gesture capture mode of operation, user activity detected at the touch input 108 is processed by the x-y input capture module 212, the x-y-to-gesture translation module 216, and the gesture-to-key code translation module 220, thereby causing x-y motion to be translated to gesture data and subsequently to a key code value. On the other hand, in the navigation mode of operation, either outputs of the x-y input capture module 212 or outputs of the x-y-to-gesture translation module 216 may be used to control motion of a cursor, pointer, selection tool, object, etc., on the display screen 104.

Accordingly, after the touch input 108 is in the gesture capture mode, the process continues when x-y motion is detected at the touch input 108 (step 412). The manner in which x-y motion is detected will depend upon the type of touch input 108 being employed. In some embodiments, a series of images of the user's finger captured by the touch input 108 may be compared to determine an x-y motion of the user's finger with respect to the touch input 108. In some embodiments, contact or pressure applied by the user to a touch pad may be registered and as the user moves their finger the motion of the pressure about the touch pad may be analyzed to determine an x-y motion of the user's finger with respect to the touch input.

In some embodiments, the process continues with the x-y input capture module 212 analyzing the captured x-y motions detected at the touch input 108 and determining x-y motion data based on the captured x-y motions detected at the touch input 108 (step 416). The x-y input capture module 212 provides the determined x-y motion data as an input to the x-y-to-gesture translation module 216. The x-y-to-gesture translation module 216 analyzes the x-y motion data and utilizes the translation data 224 to translate the x-y motion data to gesture data (step 420).

Thereafter, the x-y-to-gesture translation module 216 provides the determined gesture data as input to the gesture-to-key code translation module 220. The gesture-to-key code translation module 216 analyzes the gesture data and utilizes the translation data 224 to translate the gesture data to a key code output (step 424). The gesture-to-key code translation module 216 may further determine whether the key code output corresponds to a command for exiting the gesture capture mode of operation (step 428). Referring to the example of FIG. 3, if the gesture data corresponds to a SWIPE UP gesture, then the query of step 428 is answered affirmatively. Otherwise, the query of step 428 is answered negatively.

In the case where the determined key code output does not correspond to a command to exit the gesture capture mode of operation, the display screen 104 is updated to reflect the detected user input (step 432). In some embodiments, the display screen 104 depicts the determined value in the key code data field 304. The depicted value may correspond to an input that is usually provided by the keypad input 112 even though the input was received at the touch input 108.

Referring back to step 428, if the determined key code output does correspond to a command to exit the gesture capture mode of operation, then one or both of the translation modules 216, 220 are removed from the sequence of modules used to process x-y motion inputs captured by the touch input 108 and the user is allowed to operate the touch input 108 in the navigation mode (step 436). In some embodiments, this means that the user may move a cursor in the x-y direction around the display screen 104 and select a character, character type, or string of characters that have been suggested by the text module 236.

After step 432 or 436, the process continues by determining whether more input has been or will be received at the touch input (step 440). If not, then one or more keyboard actions are performed which are consistent with the determined key code values (step 444).

If, on the other hand, more input is going to be received at the touch input 108 (e.g., a user is not done composing a text message), then the process continues by determining whether the user wants to re-enter the gesture capture mode (step 448). Entry back into the gesture capture mode may be achieved by making one or more selections with the touch input 108 or by pressing one or more buttons on the keypad input 112. If the touch input 108 was never taken out of the gesture capture mode, then the query of step 448 is answered negatively and the process continues to step 412. Otherwise, the process returns to step 408. If the touch input 108 was taken out of the gesture capture mode, then it may be desirable to query the user as to whether or not they want to re-enter the gesture capture mode or provide some option for re-entering the gesture capture mode.

While it is not necessary to utilize the gesture capture mode to perform certain tasks on the user device 100 (e.g., compose text messages or interact with DTMF-enabled audio menus), the process depicted in FIG. 4 is intended to depict the data flows which occur when a gesture capture mode is employed. If a user decides to perform tasks without the assistance of the gesture capture mode, then traditional keypad inputs 112 and navigation via the touch input 108 may be used to perform the tasks. However, utilization of the gesture capture mode may provide a quicker and easier way of performing a task as compared to situations where the gesture capture mode is not used. In particular, utilization of the gesture capture mode may enable a user to perform certain tasks or cause the user device 100 to take certain actions with fewer inputs or motions than if the navigation mode were employed.

With reference now to FIGS. 5A-C, 6A-D, and 7A-D, one example of inputting a string of Chinese words via a touch input 108 operating in a gesture capture mode will be described. Although the string of words is only depicted as including 3 words, the concepts described herein may be utilized to input strings of fewer or lesser words, fewer or lesser characters, or even a single character, if desired. Moreover, the concepts described herein may also be applied with text modules 236 that facilitate the creation of text messages in any language. Likewise, the concepts described herein may also be applied to generate one or more DTMF tones via the touch input 108 for transmission to another communication device.

Figure 5C:
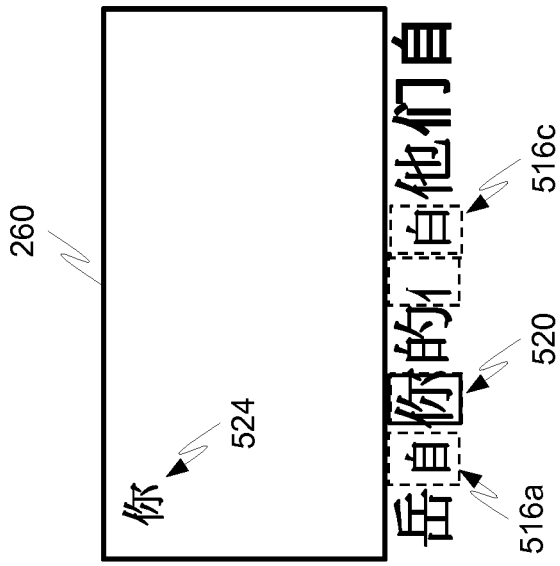
FIG. 5C depicts a user output after the first word in FIG. 5A is selected.
Figure 5A:
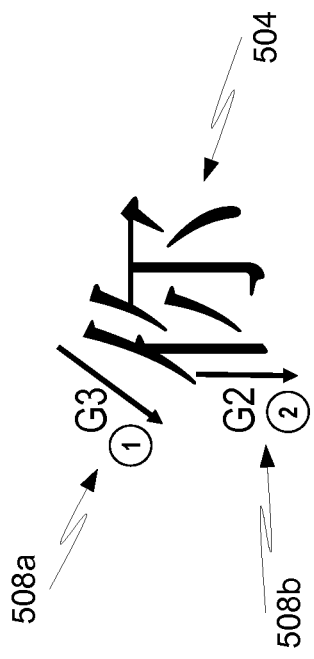
FIG. 5A depicts a first word and corresponding input gestures to create the same in accordance with embodiments of the present disclosure.
Figure 5B:
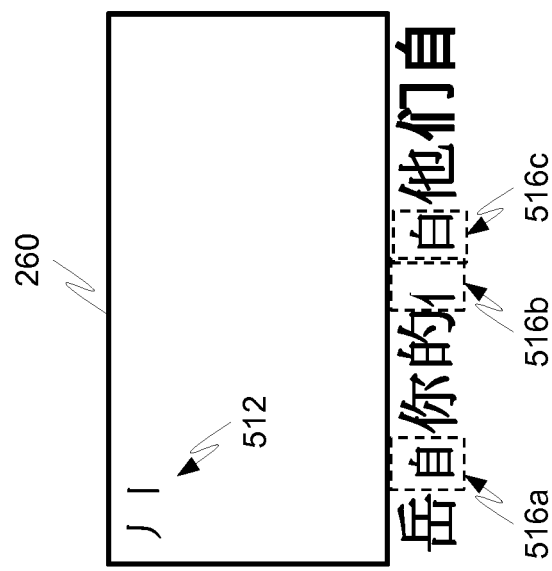
FIG. 5B depicts a user output after receiving the first and second input gestures depicted in FIG. 5A.

Referring initially to FIGS. 5A-C, a process for inputting a first Chinese word 504 will be described. A formal composition of the first Chinese word 504 may require eight or more strokes to compose. However, with the assistance of the text module 236 and predictive component 240, the first Chinese word 504 may be input with only two input gestures 508a and 508b. As can be appreciated, a greater or lesser number of input gestures may be used to input the first Chinese word 504 without departing from the scope of the present disclosure.

Initially, the user will open the text module 236 and a blank message composition screen will be displayed to the user via the user output 260. The user may then input the first two gestures 508a and 508b via the touch input 108. The first gesture 508a may be determined to be a gesture of SWIPE DOWN-LEFT, which is mapped to a key code value of G3. The second gesture 508b may be determined to be a gesture of SWIPE DOWN, which is mapped to a key code value of G2.

After the first gesture 508a is received at the touch input 108 and processed by the applicable modules in memory 204, the user output 260 is updated to display a downwards right-to-left stroke. Similarly, after the second gesture 508b is received at the touch input 108 and processed by the applicable modules in memory 204, the user output 260 is updated to display a vertical stroke. The user output 260 is then displaying a first sequence of stroke inputs 512 which are also processed by the predictive component 240. The predictive component 240 may then provide a menu of possible words or complete words on the bottom part of the user output 260. Candidate words or word types may be highlighted on the user output 260 with one or more highlighting boxes 516a, 516b, and/or 516c.

Once the user has entered enough gestures to decrease the number of highlighting boxes 516a-c to a desired number, the user may input a third gesture of SWIPE UP which causes the touch input 108 to exit the gesture capture mode. The user may then move a cursor among the candidate words or word types suggested by the predictive component 240 and select the desired character or word with a selection tool 520. This results in the display on the user output 260 being updated to replace the first sequence of stroke inputs 512 with the first selected word 524, which corresponds to the first Chinese word 504.

Referring now to FIGS. 6A-D, a process for inputting a second Chinese word 604 will be described. A formal composition of the second Chinese word 604 may require five or more strokes to compose. However, with the assistance of the text module 236 and predictive component 240, the second Chinese word 604 may be input with only two input gestures 608a and 608b. As can be appreciated, a greater or lesser number of input gestures may be used to input the second Chinese word 604 without departing from the scope of the present disclosure. In some embodiments, the second Chinese word 604 may be composed after the first Chinese word 504 to construct a string of words in a text message.

The user may input the first two gestures 608a and 608b via the touch input 108. The first gesture 608a may be determined to be a gesture of SWIPE RIGHT, which is mapped to a key code value of G1. The second gesture 608b may be determined to be a gesture of SWIPE LEFT, which is mapped to a key code value of G5.

After the first gesture 608a is received at the touch input 108 and processed by the applicable modules in memory 204, the user output 260 is updated to display a horizontal stroke. Similarly, after the second gesture 608b is received at the touch input 108 and processed by the applicable modules in memory 204, the user output 260 is updated to display a hook/bend stroke. The user output 260 is then displaying a second sequence of stroke inputs 612 which are processed by the predictive component 240. The predictive component 240 may then provide a menu of possible words or word types on the bottom part of the user output 260. Candidate words or word types may be highlighted on the user output 260 with one or more highlighting boxes 616a and/or 616b.

Once the user has entered enough gestures to decrease the number of highlighting boxes 616a-b to a desired number, the user may input a third gesture of SWIPE UP which causes the touch input 108 to exit the gesture capture mode. The user may then operate the touch input 108 in navigation mode and move a cursor among the candidate words or word types suggested by the predictive component 240 and select the desired word type or word with a selection tool 620. This results in the display on the user output 260 being updated to replace the second sequence of stroke inputs 612 with the selected word type 624. Upon selection of the word type 624, the selection bar would be altered to provide a selection of words belonging to the selected word type 624. The user may be allowed to further navigate this selection bar via the touch input 108 operating in the navigation mode and select a desired character or word with selection tool 628. This causes the display on the user output 260 being to be updated by replacing the selected word type 624 with a second selected word 632, which corresponds to the second Chinese word 604. At this point the user output 260 may display both the first Chinese word 504 and second Chinese word 604.

Referring now to FIGS. 7A-D, a process for inputting a third Chinese word 700 will be described. In contrast to the first and second Chinese words 504 and 604, respectively, the third Chinese word 700 may correspond to a complex word that can be split into a first part 704 and a second part 712. A formal composition of the third Chinese word 700 may require eight or more strokes to compose. However, with the assistance of the text module 236 and predictive component 240, the third Chinese word 700 may be input with only four input gestures 708a, 708b, 708c, and 716. The first three gestures 708a, 708b, and 708c may be used to construct the first part 704 of the third Chinese word 700 whereas the fourth gesture 716 may be used to construct the second part 708 of the third Chinese word 700. As can be appreciated, a greater or lesser number of input gestures may be used to create the third Chinese word 700 without departing from the scope of the present disclosure. In some embodiments, the third Chinese word 700 may be composed after the first and second Chinese words 504, 604 to construct a string of words in a text message.

The user may input the first three gestures 708a, 708b, and 708c via the touch input 108. The first gesture 708a may be determined to be a gesture of SWIPE DOWN, which is mapped to a key code value of G2. The second gesture 708b may be determined to be a gesture of SWIPE LEFT, which is mapped to a key code value of G5. The third gesture 708c may be determined to be a gesture of SWIPE RIGHT, which is mapped to a key code value of G1.

After the first gesture 708a is received at the touch input 108 and processed by the applicable modules in memory 204, the user output 260 is updated to display a vertical stroke. Similarly, after the second gesture 708b is received at the touch input 108 and processed by the applicable modules in memory 204, the user output 260 is updated to display a hook/bend stroke. After the third gesture 708c is received at the touch input 108 and processed by the applicable modules in memory 204, the user output 260 is updated to display a horizontal stroke. The user output 260 is then displaying a third sequence of stroke inputs 720 which are processed by the predictive component 240. The predictive component 240 may then provide a menu of possible words or word types on the bottom part of the user output 260. Candidate words or word types may be highlighted on the user output 260 with one or more highlighting boxes 724a, 724b, and/or 724c.

Once the user has entered enough gestures to decrease the number of highlighting boxes 724a-c to a desired number, the user may input a fourth gesture of SWIPE UP, which causes the touch input 108 to exit the gesture capture mode. The user may then operate the touch input 108 in navigation mode and move a cursor among the candidate words or word types suggested by the predictive component 240 and select the desired word type or word with a selection tool 732. This results in the display on the user output 260 being updated to replace the third sequence of stroke inputs 720 with a selected word type. Upon selection of the word type, the selection bar would be altered to provide a selection of words belonging to the selected word type.

Figure 6A:
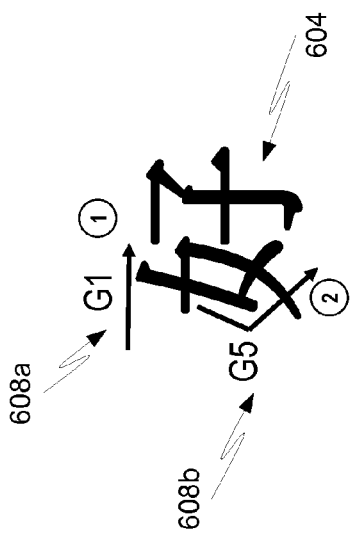
FIG. 6A depicts a second word and corresponding input gestures to create the same in accordance with embodiments of the present disclosure.
Figure 6D:
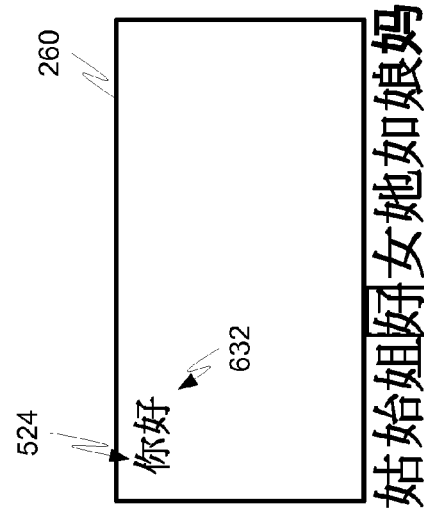
FIG. 6D depicts a user output after the second word in FIG. 6A is selected.
Figure 6C:
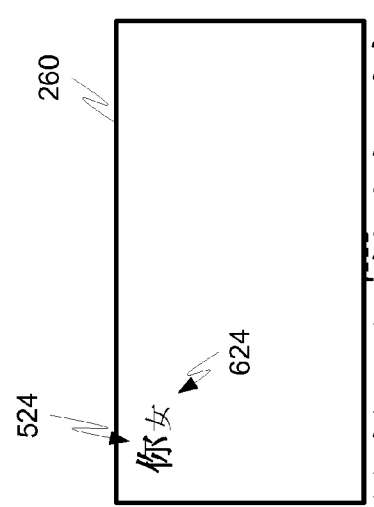
FIG. 6C depicts a user output after receiving a word type selection.
Figure 6B:
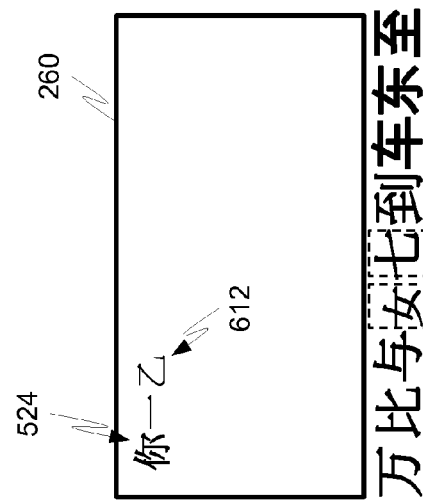
FIG. 6B depicts a user output after receiving the first and second input gestures depicted in FIG. 6A.

When compared to the altered selection bar depicted in FIG. 6D, the altered selection bar depicted in FIG. 7D may still comprise a significant number of words belonging to the selected word type. Accordingly, the user may desire to re-enter the gesture capture mode and provide more gesture inputs to further reduce the number of candidate words or word types depicted in the altered selection bar. Upon re-entering the gesture capture mode, the user may input the fourth gesture 716 via the touch input 108. The fourther gesture may be determined to be another gesture of SWIPE LEFT, which is mapped to a key code value of G5. Entry of the fourth gesture 716 causes the user output 260 to display the selected word type along with a hook/bend stroke, which corresponds to a fourth sequence of stroke inputs 728. The additional gesture input may cause the predictive component to highlight certain words or remove certain words from the altered selection bar.

Thereafter, the user enters another gesture corresponding to a SWIPE UP, which causes the touch input 108 to again exit the gesture capture mode. The user may then operate the touch pad 108 in the navigation mode and move a cursor 732 among the candidate words or word types suggested by the predictive component 240 to select a desired word with selection tool 740. This causes the display on the user output 260 being to be updated by replacing the fourth sequence of stroke inputs 728 with a third selected word 736, which corresponds to the third Chinese word 700. At this point the user output 260 may display the first Chinese word 504, second Chinese word 604, and third Chinese word 700. This message may then be transmitted via the communication interface 264 or futher edited as desired.

Figure 8:
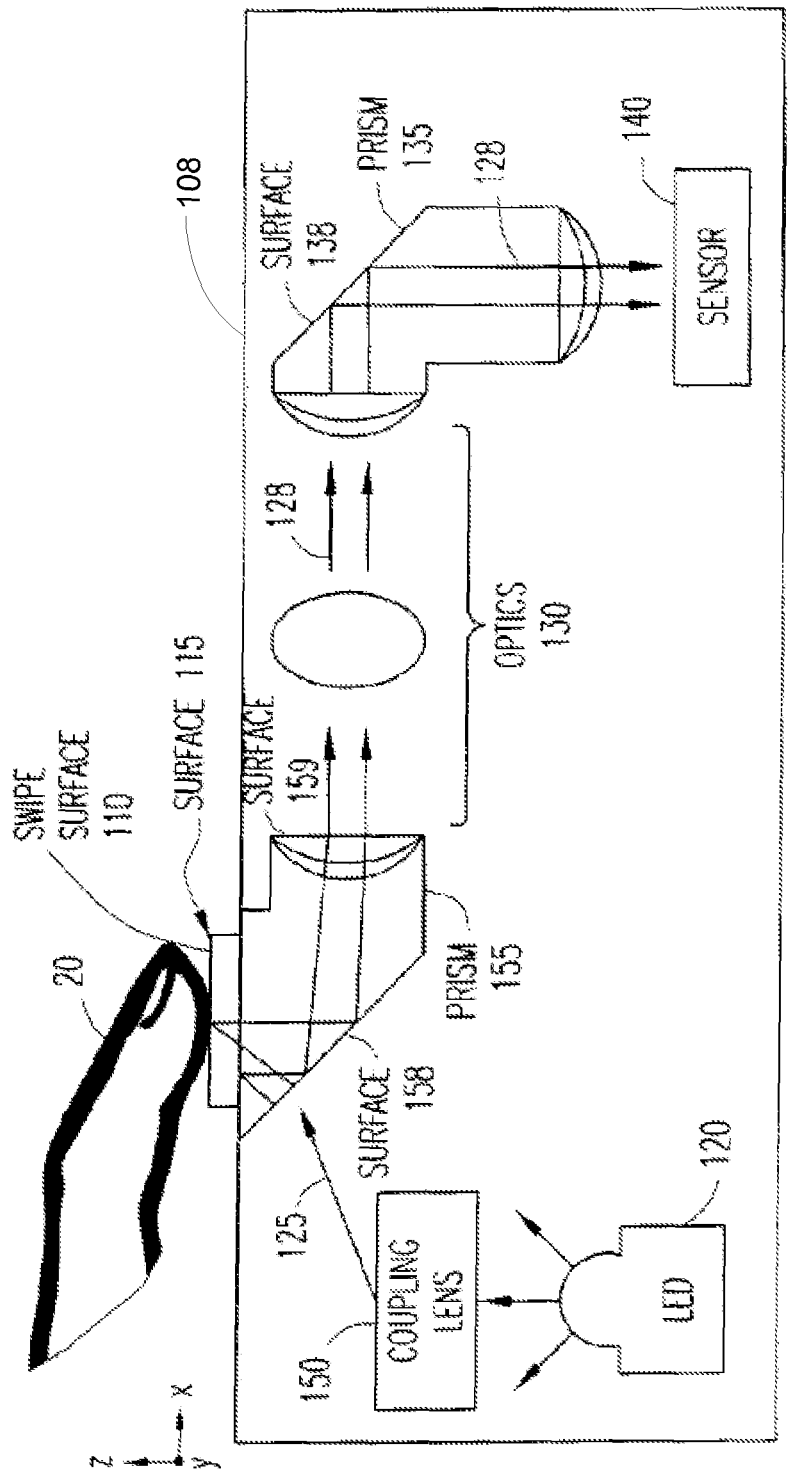
FIG. 8 depicts an optically-enabled touch input in accordance with embodiments of the present disclosure.

With reference now to FIG. 8, details of an optically-enabled touch input 108 will be described in accordance with embodiments of the present disclosure. As discussed above, an optically-enabled touch input 108 is but one of many suitable types of touch inputs 108 which may employ the teachings of the present disclosure. Furthermore, optically-enabled touch inputs 108 having different components or component configurations than the optically-enabled touch input 108 depicted in FIG. 8 may be employed without departing from the scope of the present disclosure. Further details of suitable optically-enabled touch inputs 108 are described, for example, in U.S. Pat. No. 7,274,808 to Baharav et al., the entire contents of which are hereby incorporated herein by reference.

Light 125 emitted from the LED 120 is coupled by a coupling lens 150 towards a prism 155 that directs the light 125 at a desired angle of incidence to the swipe interface 110. Depending on the shape of the prism 155 and angle of incidence, the light 125 may be directed using a total internal reflection (TIR) mechanism. In other embodiments, the light 125 may be directed using a reflected light mechanism. In FIG. 8, the light 125 passes through a first surface 158 of the prism 155 and refracted towards the top surface 115 of the swipe interface 110 at the desired angle of incidence. Light 128 reflected back from the finger 20 pressed against the surface 115 of the swipe interface 110 is internally reflected off the first surface 158 of the prism 155 and passes through a second surface 159 of the prism 155.

The reflected light 128 exiting from the prism 155 travels in the x-direction, orthogonal to the elongated direction of the swipe interface 110, and passes through magnification optics 130 that directs the reflected light 128 towards another prism 135. The prism 135 internally reflects the light 128 off of surface 138 to redirect the light 128 in the z-direction to the sensor 140. By utilizing folded optics in the x-direction, instead of traditional optics in the z-direction, the thickness of the swipe module 110 in the z-direction can be reduced. It should be understood that additional optical components, such as apertures and lenses, can also be used in the illumination optics 150 and/or image transfer optics 130. In addition, other optical arrangements can also be used to fold the optical path of the light instead of the optical arrangement shown in FIG. 8.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software. Accordingly, the methods/algorithms discussed herein could be implemented either as a hardware function in silicon or as firmware in an external controller or microcontroller.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, and/or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A process of translating user input received at a touch input of a user device into key code data while the touch input is operating in a gesture capture mode, the process comprising:
   detecting user-initiated motion at the touch input, wherein the touch input is separate from and smaller than a user output;
   translating the detected motion into x-y motion data;
   referencing first translation data that provides a mapping between x-y motion data and gesture data;
   based on the reference to the first translation data, translating the x-y motion data into gesture data, the gesture data representing a predetermined gesture that has been mapped to a predetermined x-y motion data value within the first translation data, wherein the gesture data corresponds to one gesture from a finite set of gestures that consist of a tap gesture and a unidirectional swipe gesture;
   referencing second translation data that provides a mapping between gesture data and key code data, wherein two or more gestures defined in the second translation data are mapped to a common key code;
   based on the reference to the second translation data, translating the gesture data into key code data, the key code data representing a predetermined key code that has been mapped to the predetermined gesture within the second translation data, wherein the key code data causes a processor of the user device to dynamically update a predictive menu portion of the user output with one or more suggested characters or suggested strings of characters that contain a stroke which corresponds to the key code data, wherein the predictive menu portion is continuously and dynamically updated in response to detecting subsequent user-initiated motions at the touch input, and wherein the one or more suggested characters or suggested strings of characters are updated to eliminate any character or string of characters from the predictive menu portion that do not contain a stroke corresponding to the key code data; and
   providing the key code data to a processor of the user device.

2. The process of claim 1, wherein the user device further comprises a keypad input and wherein the key code data emulates data outputs of the keypad input and is processed by the processor in an identical manner as outputs received from the keypad input.

3. The process of claim 1, wherein the predetermined key code is the common key code having two or more gestures mapped thereto and wherein the gesture data is translated to key code data which comprises a value corresponding to a command to generate and transmit a DTMF tone.

4. The process of claim 1, wherein the gesture data is selected from a list of gestures including one or more of the following gestures: SWIPE UP, SWIPE DOWN, SWIPE LEFT, SWIPE RIGHT, SWIPE UP-RIGHT, SWIPE DOWN-RIGHT, SWIPE DOWN-LEFT, SWIPE UP-LEFT, and TAP.

5. The process of claim 1, wherein the touch input comprises one or more of an optical sensor, a small area capacitive sensor, rocker switches, a miniature joystick, a twiddle, and a touch-screen input.

6. The process of claim 1, wherein the keypad is configured as one of a QWERTY keyboard and a telephone dial-pad.

7. A non-transitory computer-readable medium comprising processor-executable instructions that, when executed by the processor of the user device, perform the method of claim 1.

8. A user device, comprising:
   a user interface including a touch input and a user output, wherein the touch input is separate from and smaller than the user output;
   a user interface driver configured to convert motions detected by the touch input into electronic signals;
   computer-readable memory comprising one or more processor-executable instruction sets, the instruction sets including:
     an x-y input capture module configured to translate the electronics signals provided by the user interface driver into x-y motion data;
     an x-y-to-gesture translation module configured to reference first translation data to translate the x-y motion data into gesture data, the gesture data representing a predetermined gesture that has been mapped to a predetermined x-y motion data value within the first translation data, wherein the gesture data corresponds to one gesture from a finite set of gestures that consist of a tap gesture and a unidirectional swipe gesture; and
     a gesture-to-key code translation module configured to reference second translation data to translate the gesture data into key code data, wherein two or more gestures defined in the second translation data are mapped to a common key code, and wherein the key code data represents a predetermined key code that has been mapped to the predetermined gesture within the second translation data, wherein the key code data causes a processor of the user device to dynamically update a predictive menu portion of the user output with one or more suggested characters or suggested strings of characters that contain a stroke which corresponds to the key code data, wherein the predictive menu portion is continuously and dynamically updated in response to detecting subsequent user-initiated motions at the touch input, and wherein the one or more suggested characters or suggested strings of characters are updated to eliminate any character or string of characters from the predictive menu portion that do not contain a stroke corresponding to the key code data; and a processor configured to execute the instruction sets stored in the computer-readable memory.

9. The device of claim 8, wherein the user interface driver is in the form of a hardware function implemented in silicon.

10. The device of claim 8, further comprising translation data which maps at least one of x-y motion to gesture data, x-y motion to key code data, and gesture data to key code data.

11. The device of claim 10, wherein the translation data is reconfigurable depending upon whether a user of the user device manipulates the touch input with a right hand or a left hand.

12. A system for translating user input received at a touch input of a user device into key code output, the system comprising:

a processor configured to execute instructions stored in memory; and memory comprising at least the following processor-executable instructions:

a user interface driver configured to convert motions detected at the touch input into electronic signals, wherein the touch input is separate from and smaller than a user output of the user device;

an x-y input capture module configured to translate the electronics signals provided by the user interface driver into x-y motion data;

an x-y-to-gesture translation module configured to reference first translation data to translate the x-y motion data into gesture data, the gesture data representing a predetermined gesture that has been mapped to a predetermined x-y motion data value within the first translation data, wherein the gesture data corresponds to one gesture from a finite set of gestures that consist of a tap gesture and a unidirectional swipe gesture; and a gesture-to-key code translation module configured to reference second translation data to translate the gesture data into key code data, wherein two or more gestures defined in the second translation data are mapped to a common key code, wherein the key code data represents a predetermined key code that has been mapped to the predetermined gesture within the second translation data, wherein the key code data causes a processor of the user device to dynamically update a predictive menu portion of the user output with one or more suggested characters or suggested strings of characters that contain a stroke which corresponds to the key code data, wherein the predictive menu portion is continuously and dynamically updated in response to detecting subsequent user-initiated motions at the touch input, and wherein the one or more suggested characters or suggested strings of characters are updated to eliminate any character or string of characters from the predictive menu portion that do not contain a stroke corresponding to the key code data.

13. The system of claim 12, wherein the x-y-to-gesture translation module is configured to operate in an 8-way rocker mode where x-y motion data is translated into one gesture selected from a list of gestures comprising no more than eight gestures.

* * * * *